United States Patent [19]
Alessi et al.

[11] Patent Number: 5,844,681
[45] Date of Patent: Dec. 1, 1998

[54] SPECTRAL DENSITOMETER

[75] Inventors: Christi M. Alessi, Rochester, N.Y.; Curtis A. Corum, Chandler, Ariz.; Cormic K. Merle; Anna M. Dean, both of Rochester, N.Y.

[73] Assignee: Lucid Inc, Henrietta, N.Y.

[21] Appl. No.: 891,609

[22] Filed: Jul. 11, 1997

Related U.S. Application Data

[60] Provisional application No. 60/016,932 Jul. 17, 1996.
[51] Int. Cl.⁶ .................................................... G01J 3/42
[52] U.S. Cl. ............................................ 356/319; 356/328
[58] Field of Search .............................. 356/72, 319, 326, 356/328

[56] References Cited

U.S. PATENT DOCUMENTS

| | | | |
|---|---|---|---|
| 3,704,953 | 12/1972 | Carter et al. ............................. | 356/326 |
| 4,320,296 | 3/1982 | Ishida et al. . | |
| 4,589,774 | 5/1986 | Dupree et al. . | |
| 4,632,562 | 12/1986 | Dupree et al. . | |
| 4,645,343 | 2/1987 | Stockdale et al. ....................... | 356/326 |
| 4,737,463 | 4/1988 | Bhattacharjee et al. . | |
| 4,889,223 | 12/1989 | Bergstrom . | |
| 4,935,875 | 6/1990 | Shah et al. .............................. | 356/319 |
| 5,004,921 | 4/1991 | Moscovitch . | |
| 5,206,118 | 4/1993 | Sidney et al. . | |
| 5,267,178 | 11/1993 | Berner ..................................... | 356/319 |
| 5,386,287 | 1/1995 | Berssen et al. ......................... | 356/326 |
| 5,399,868 | 3/1995 | Jones et al. . | |
| 5,400,138 | 3/1995 | Peterson et al. ........................ | 356/319 |
| 5,572,027 | 11/1996 | Tawil et al. . | |
| 5,581,449 | 12/1996 | Hamandjian . | |
| 5,596,202 | 1/1997 | Arakawa . | |
| 5,637,876 | 6/1997 | Donahue et al. ..................... | 250/474.1 |

*Primary Examiner*—F. L. Evans
*Attorney, Agent, or Firm*—K. LuKacher; M. LuKacher

[57] ABSTRACT

A spectral densitometer system reads dosimeter cards. The cards contain bar codes with information for calibration of the system and for identification of the cards (serial numbers for each card). The densitometer has compartments optically and physically separated by a mechanism which contains a slide for receiving the cards and moving them into alignment with openings which expose the bar code to a bar code scanner in one of the compartments. The compartment containing the scanner also contains a source of illumination which projects through another opening and through a radiation sensitive patch. A scanning spectrophotometer in the other compartment reads the spectrum of the transmitted illumination. The system includes a computer, which may be a separate host computer, connected to the spectrophotometer and the bar code reader via communication ports. The computer computes the dosage based upon the wavelength measurements and the calibration information contained in the bar code. The bar code reading and spectral measurements are individual to each card thereby preventing mixups which are likely to occur if separate instruments for bar code reading and spectral measurements were used. The optical isolation provided by the slide mechanism prevents light leaks which can lead to false spectral measurements. The dosage readings are made automatically, rapidly and accurately with the integrated spectral densitometer and bar code reader of the system.

11 Claims, 5 Drawing Sheets

SPECTRAL DENSITOMETER

This application claims the priority Benefit of U.S. Provisional application Ser. No. 60/016,932, filed Jul. 17, 1996.

DESCRIPTION

The present invention relates to spectral densitometer systems and particularly to a spectral densitometer system for reading dosimeter cards containing a patch of material having an optical density in transmission related to the amount of irradiation (dosage) of the patch and a bar code identifying the card and the response of the patch to radiation. More particularly, the invention provides a unit for rapid, accurate and convenient reading of cards containing dosimeter patches and bar codes and computing the dosage represented by the change in optical transmission of the patch over a multiplicity of wavelengths or a wavelength range.

Dosimeter cards have been proposed containing patches of polymer films, which change their transmissivity in response to exposure to ionizing radiation, particularly gamma radiation, as well as bar codes containing information as to the optical response characteristics of the patch and other information, for example, serial numbers identifying each card. The cards may be used as a dosage measuring device which may be worn by personnel in facilities containing radioactive material or other sources of ionizing radiation.

Materials which are mounted on such dosimeter cards, as the patches, may be photochromic polymer films, such as described in an article entitled "Sensitometry of the Response of a New Radiochromic Film Dosimeter to Gamma Radiation and Electron Beams" by W. L. McLaughlin, et al. which appeared in the journal Nuclear Instruments and Methods in Physics Research, A302 (1991) 165–176. Such materials change there spectral characteristics and become darker over a wavelength band. The darkness or density is related to the amount of absorbed radiation or dosage. The relationship of dosage to density is a generally linear curve over a wavelength band, but the slope of the curve varies from batch to batch of the photochromic dosimeter material. Accordingly, for accurate measurements, calibration data reflecting the relationship is relevant to the accuracy of dosage measurement when such photochromic materials are used to detect and measure dosage. In addition, each card requires identification so as to correlate the card with the calibration data, and the wearer of the card, when it is used as a dosimeter badge. Bar code symbols containing such calibration and identification data has been imprinted on cards carrying dosimeter patches, but errors in coordination of the calibration and identification data with the patch on individual cards has been difficult because separate spectrophotometers and bar code readers have been used for the spectral measurements and the reading of the bar codes, respectively. It is desirable to avoid mixups which can occur through the use of such separate bar code reader and spectrophotometer instruments. It is also desirable that the dosage readings be carried out rapidly as well as accurately with complete correlation of the bar codes and the spectral measurements. Separate bar code readers and spectral photometers are also inconvenient to use, and the use thereof requires trained personnel.

It is the principal feature of this invention to provide an improved spectral densitometer system whereby spectral and bar code measurements from photochromic material and of a bar code contained on the same device may be made rapidly, accurately and conveniently.

It is a still further object of the present invention to provide an integrated bar code scanner and spectral measurement reader which is a unitary package and which is adapted for reading dosimeter cards containing radiation sensitive materials, the absorption spectra of which varies with dosage of radiation, as well as codes, particularly bar codes identifying the cards, and containing information for facilitating the spectral measurements.

It is a still further object of the present invention to provide a unified and integrated spectral densitometer and bar code reading system which may use a computer either internally or externally of the instrument for obtaining dosage measurements.

Briefly described, a spectral densitometer system embodying the invention is capable of reading dosimeter cards containing patches of radiation sensitive material and bar codes identifying the cards and the patches. A unit is provided having compartments including a mechanism which optically and mechanically separates compartments on opposite sides of the mechanism and has a slide which receives, individually, the cards. In one of these compartments, there is a source of illumination and a bar code scanner, such as a laser scanner, sometimes called a bar code scan engine. The mechanism assembles sections of a housing providing the compartment and components therein into an integral unitary structure. On the other side of the mechanism and in the other compartment is a spectrophotometer capable of scanning over multiple wavelengths. The slide of the mechanism is reciprocal between a position outside of the unit for receiving a dosimeter card and a position inside of the unit where the bar code is exposed through an opening in the mechanism to the bar code scan engine. Simultaneously, the dosimeter patch is placed in alignment with openings in the mechanism and light from the source projects through these openings via the patch into the spectrophotometer engine. Data is obtained as to the bar code information and as to the spectral measurements from the bar code reader and spectrophotometer, respectively. Such readings are applied to a computer which utilizes calibration information from the bar code and the spectral measurements to compute the dosage for each card. Each measurement is therefore made rapidly upon the insertion of the slide with a dosimeter card and accurately, without mixup or confusion of bar code and spectral information, from the same card with similar information from other cards. The mechanism between the compartments isolates the light from the source of illumination and the bar code reader, particularly the laser of such reader, and from the spectrophotometer thereby preventing light leaks which could lead to incorrect dosage computations. The system provided by the invention, thus further assures accuracy of dosage measurement.

The foregoing and other objects, features and advantages of the invention, as well as a presently preferred embodiment thereof will become more apparent from a reading of the following description in connection with the accompanying drawings in which.

Figure 1:
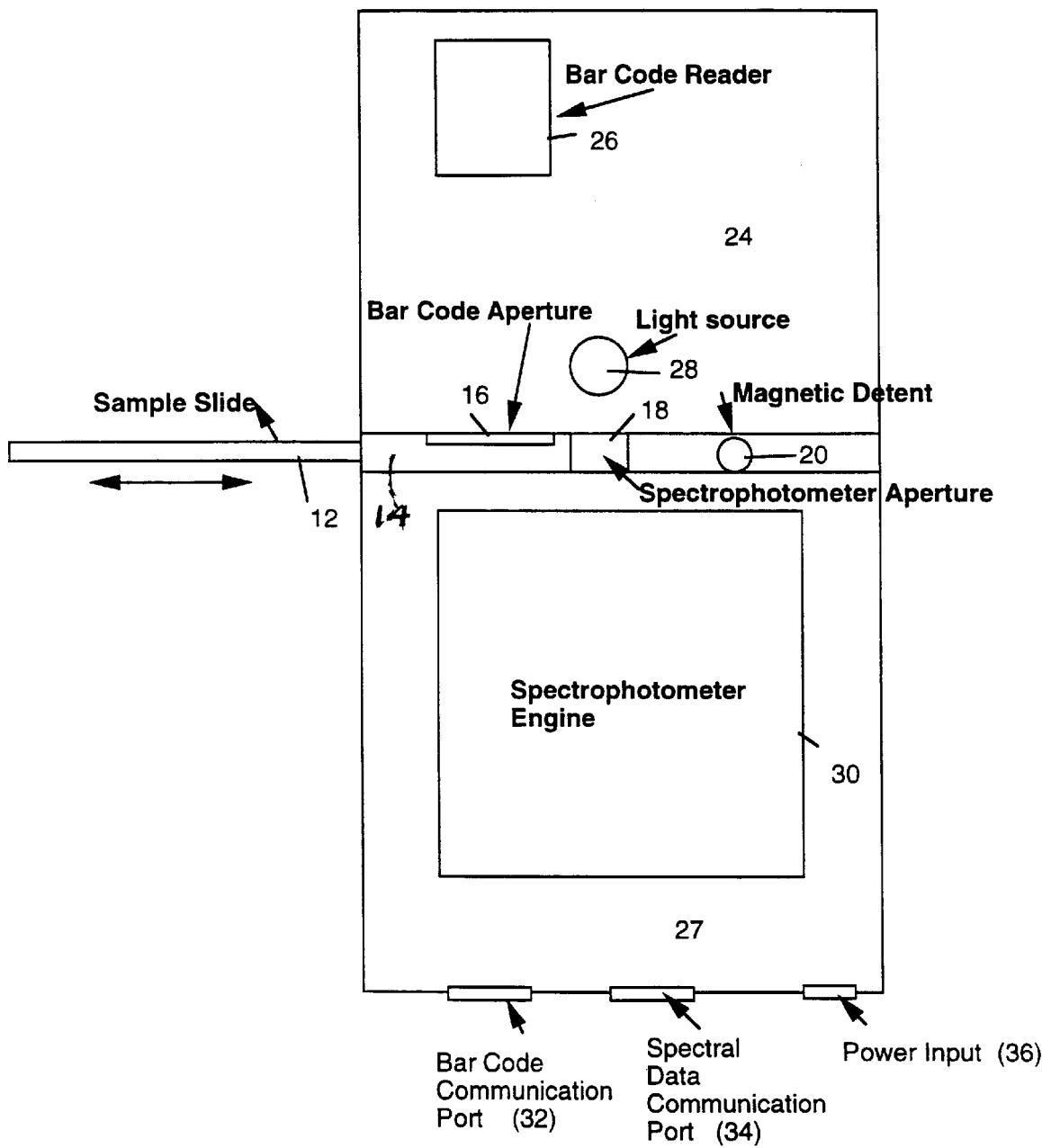
FIG. 1 is a schematic diagram showing the layout of a dosimeter card reading instrument in accordance with the invention for making spectral measurements and reading bar codes on dosimeter cards.
Figure 2:
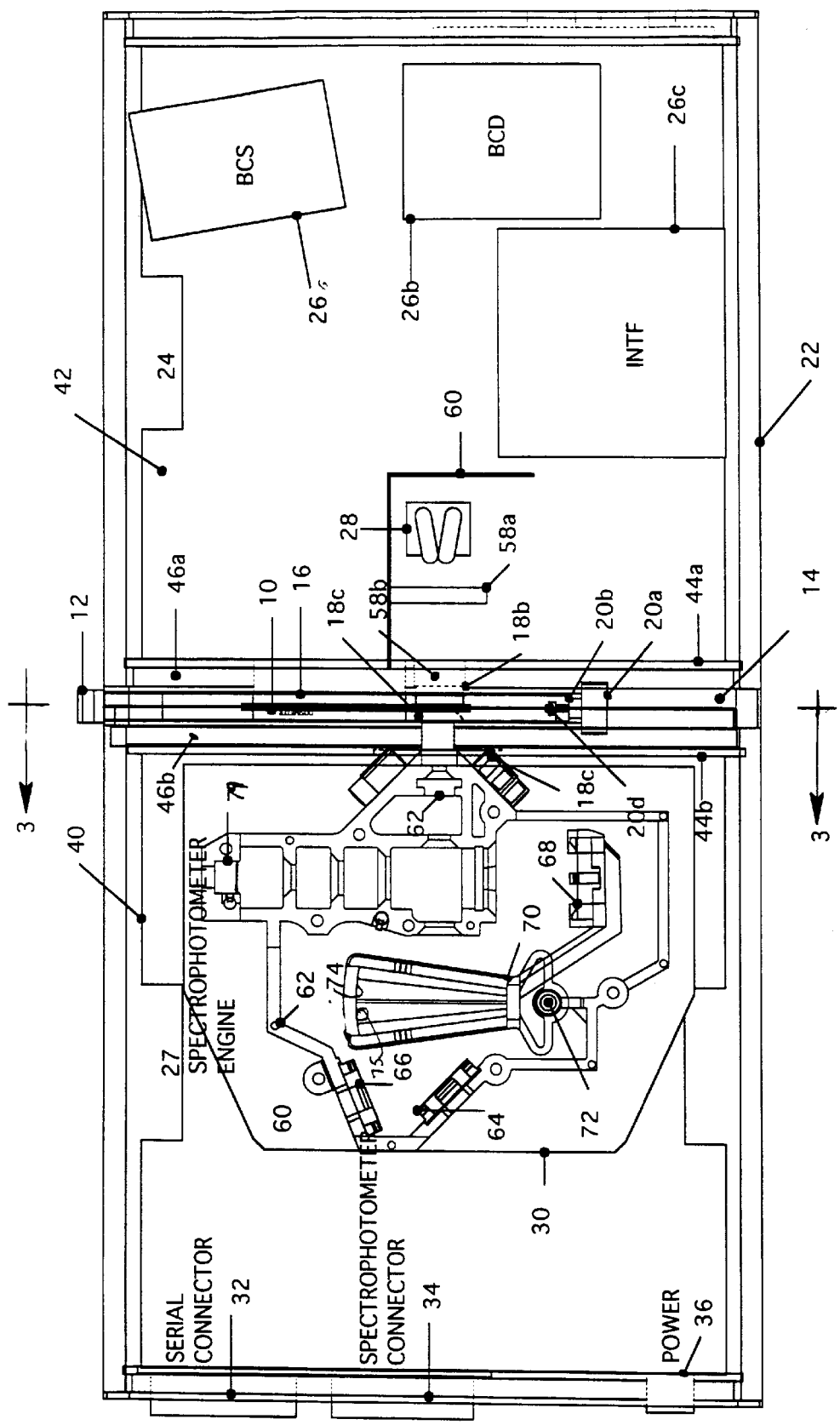
FIG. 2 is a plan view with the cover removed showing the instrument illustrated in FIG. 1 in greater detail.
Figure 3:
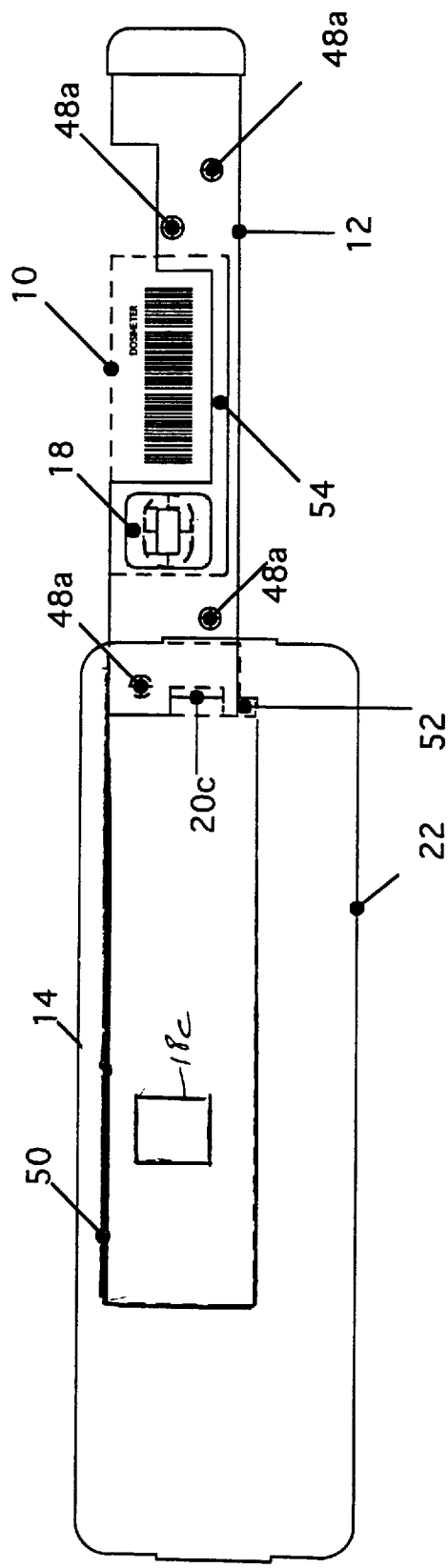
FIG. 3 is a vertical section along the line 3-3 in FIG. 2 illustrating the slide mechanism of the instrument shown in FIG. 2.
Figure 4:
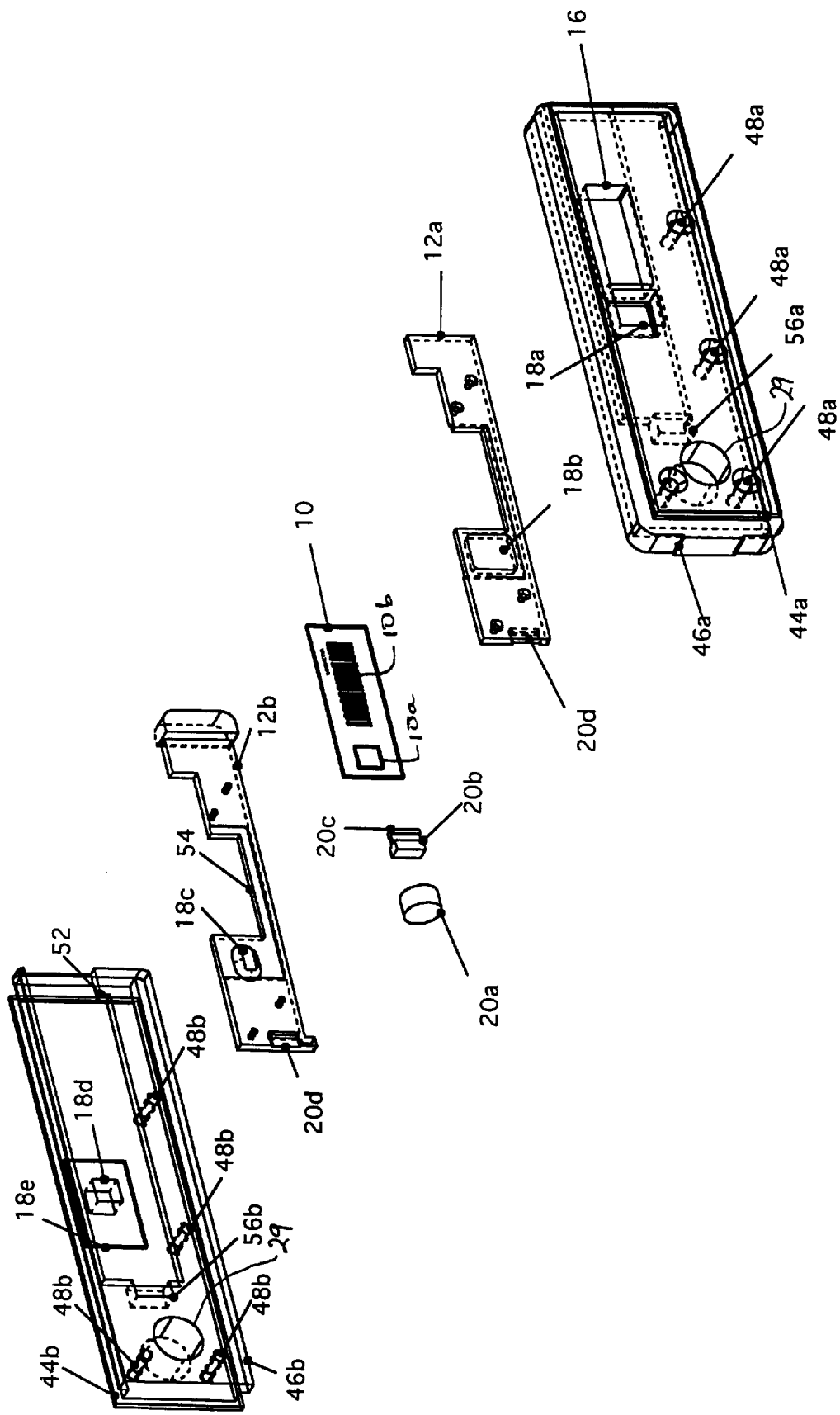
FIG. 4 is an exploded view of the slide mechanism and showing a typical dosimeter card.

Referring more particularly to FIG. 1, there is shown an instrument provided by the invention for reading dosimeter cards 10 illustrated in FIG. 4. The cards have an opening containing a patch 10a of multilayer film which is sensitive to ionizing radiation, for example, gamma rays. Such a film is described in the above referenced article by McLaughlin, et al. On one side of the card there is a bar code 10b containing calibration data for the film patch and specific to and identifying the card 10. Such cards may be approximately 1¾ of an inch in length and ⅝ of an inch in height and approximately 50 thousandths of an inch (mils) thick. The cards are inserted in a slide 12, indicated as a sample slide, in FIG. 1, which is a part of a mechanism 14 having an effectively blind hole 16 providing a bar code aperture and a through aperture 18. The slide 12 is reciprocal between two positions, one outside the instrument, as shown in FIGS. 1 & 3, for the insertion and removal of cards 10 therein and the other internal of the mechanism 14, as shown in FIG. 2, and within the instrument where the patch is in alignment with the aperture 18 and the bar code is exposed through the aperture 16. When positioned inside the mechanism 14, the slide is releasably captured by a magnetic detent which is shown at 20.

The mechanism 14 optically and physically separates a housing 22 for the instrument into two compartments 24 and 27. The compartment 24 contains a miniature bar code reader or scanner 26, which is preferably a laser bar code scan engine of a type which is commercially available, for example, from PSC Inc. of Webster, N.Y. U.S.A. The compartment 24 also contains a light source 28 which illuminates the sensitive patch 10a in card 10, through which light is transmitted and from which spectral measurements are made by a spectrophotometer module or engine 30 mounted in the other compartment 27. A computer external of the housing 22 is connected thereto via a bar code communication connector or port 32 and a spectral data communication or port 34. Connectors in these ports are wired to the bar code reader in the case of the port 32 and the spectrophotometer engine in the case of the port 34. The wiring from the bar code reader may be snaked via an opening 29 (FIG. 4) in the mechanism 14. Power for operating the engine 30 and the reader 26 and the light source 28 is obtained from wiring which is connected to a power input connector shown at 36.

Referring to FIGS. 2 through 4, the housing 22 may be provided by channel shaped shells having lower portions shown in FIG. 2 and upper portions which may be assembled thereto with screws. The lower shells have mounting boards 40 and 42 in each of the compartments 24 and 27. The shells have inner edges which snap into slots around the periphery of the mechanism 14. The channel shaped housing sections which form the compartments 24 and 27 are assembled to the mechanism 14 by snapping them into the peripheral slots in the mechanism over rims 44a and 44b in plates 46a and 46b which form the forward and rear sides of the mechanism 14. These plates are assembled by screws which extend through threaded holes 48a in the forward side plate 46a and 48b in the rear side plate 44b. The assembled side plates 46a & b define a slot 50 which captures the slide 12. The slide 12 is captured in the slot 50 by a step 52.

The slide has two parts 12a and b, which are also screwed together to define a notch 54 having a well which holds the dosimeter card 10. When in the slot 54, and the slide is advanced from its retracted position, shown in FIG. 3, to its inside position shown in FIG. 2, the patch of radiation sensitive film material is in alignment with an opening 18b in the forward plate of the plate 12a of the slide and a tapered opening 18c in the rear plate 12b of the slide. The bar code is exposed since the well of the notch 54 is below the level of the bottom of the code. Also when the slide 12 is inserted, the opening 16 is in alignment with the code and exposes the code to the laser beam from the bar code scanner (BCS) 26a. The forward slide plate 46a has an opening 18a, which is in alignment with the openings 18b and c of the slide and, therefore, with the patch of the card 10. These openings 18a, b and c and the patch are also in alignment with an opening 18d in the rear plate 46b. There is a notch 18e in the rear plate in which a nose of the spectrophotometer engine 30 is disposed.

The detent magnet 20 is a disk of permanent magnetic material captured in slots 56a and b in the forward and rear side plates 46a and 46b and a body of soft magnetic material (iron) 20b, which is mounted on a shoe 20c which is captured between the plates 12a and 12b of the slide 12 in a notch 20d formed when these plates 12a and b are fastened together.

The lamps 28 may be a pair of incandescent lamps having lenses formed at the end thereof which project broad spectrum (white) light through an infrared filter 58a and a blue light filter 58b. These filters restrict the spectrum of illumination of the patch to approximately a range between 500 and 700 nanometers. The lamps are shielded, by an optical shield 60 from the laser beam from the bar code scanner (BCS) 26a. As part of the bar code scanner, there is a bar code decoder (BCD) 26b and an interface (INTF) 26c which provides serial bar code data via the wiring to the serial connector 32. The bar code scanner components 26a, 26b and 26c, like the lamps 28, the shield 60 and the filter 58 are mounted on the plate 42 and held in place in the compartment 27, for example, by screws to the channel material of the housing sections forming the compartment 27.

The spectrophotometer 30 is preferably a spectrophotometer engine of the type which is commercially available from Lucid Technologies, Inc. of Henrietta, N.Y. U.S.A. and sold under the trademark Magenta Engine. This engine is also the subject matter of the United States patent application Ser. No. 08/322,244 filed Oct. 12, 1994 in the names of James M. Zavislan, et al. and assigned to Lucid Technologies, Inc., which owns this application now U.S. Pat. No. 5,742,389, issued Apr. 21, 1998.

Briefly, the engine is made up of a printed circuit board 60 on which is mounted a plastic wall structure 62 rigidifying the board and forming a corral having an entrance aperture 62, in alignment with the apertures 18, and other apertures which restrict the light which is projected through the patch via mirrors 64 and 66, to a diffraction grating 68 and thence through another sequence of apertures to a photodetector 79. The grating 68 is mounted on an arm assembly 70 which is rotated about a pivot 72 by a motor (not shown), the shaft 75 of which bears upon a frictional drive surface 74 of the arm 70. The motor may be a stepping motor which is stepped so as to scan different wavelengths across the range of interest separating increment as the arm 70 rotates. The photodetector 79 derives the multiple wavelength measurements as the arm 70 rotates. Reference may be made to the above identified patent application and the commercial Magenta engine for further information respecting the spectrophotometer engine 30.

Figure 5:
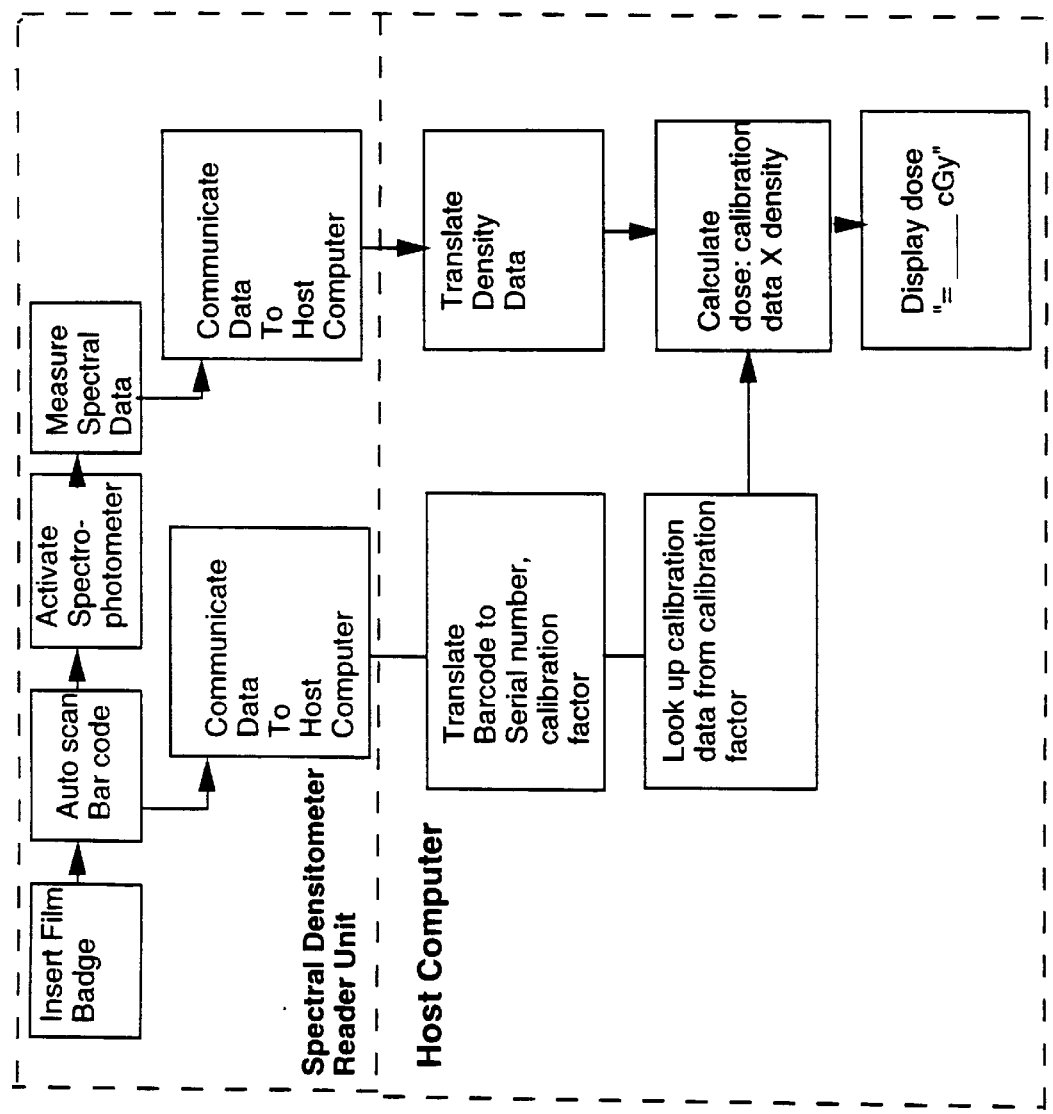
FIG. 5 is a block diagram/flow chart of the spectral dosimeter system provided by the invention.

FIG. 5 illustrates the spectral densitometer reader unit illustrated in FIGS. 1 to 4 and the host computer which is connected via the ports 32 and 34. The system operates upon insertion of the card dosimeter, also known as a film badge, into the slide 12 and the reciprocation of the slide to its home position inside the mechanism 14 where it is held by the magnetic detent 20. Then the automatic scan initiating function of the bar code scanner 26 initiates the laser beam and via the computer commands the spectrophotometer engine to turn on and make spectral measurements. The bar code is read. This spectral data reflects a multiplicity of wavelength measurements across the band (approximately from 500–700 nanometers). This data is communicated via a modem or RS-232 serial interface in the spectral densitometer to the host computer. The bar code data is also transmitted to the host computer. Both data serial bit streams are in a format such that they can be inputted and stored in the host computer. The host computer is programmed, as indicated in FIG. 5, to translate the wavelength spectral transmission data into density data. This is accomplished by integrating the wavelength measurements to provide a weighted average of the transmission functions for each wavelength increment.

In the host computer, the bar code data is translated into the serial number representing the densitometer badge or card and the calibration factor of the patch. A look up table is used to derive a calibration factor (representing the slope of the dosage versus density curve) applicable to the patch. The computer then calculates the radiation dose as derived from the density reading and the calibration factor. The dose is then displayed or printed out together with the serial number identifying the card or badge and even the individual assigned to wear the badge.

From the foregoing description, it will be apparent that there has been described an improved spectral densitometer system which provides accurate, convenient and rapid reading of spectral and bar code data, especially data relating to radiation dosage. Variations and modifications in the herein described system within the scope of the invention will undoubtedly suggest themselves to those skilled in the art.

Accordingly, the foregoing description should be taken as illustrative and not in a limiting sense.

We claim:

1. A spectral densitometer system which comprises a spectrophotometer and a bar code reader, a housing in which said spectrophotometer and bar code reader are mounted in separate compartments on opposite sides of a mechanism having a carriage for a card containing radiation sensitive media and a bar code symbol, said mechanism having apertures for directing light from a light source through an aperture therein to the spectrophotometer via the radiation sensitive media and to the bar code, said mechanism and said spectrophotometer and bar code reader being an integrated assembly, and computer means responsive to spectral measurements and bar code data for obtaining information respecting the spectral characteristics of the media.

2. A photometric instrument comprising a code symbol scanner, a spectrophotometer and means responsive to readings from said scanner and readings from said spectrophotometer for processing said spectrophotometer readings with said scanner readings and providing spectral measurement data corresponding to said processed spectrophotometer readings.

3. The instrument according to claim 2 wherein said scanner is a laser bar code scanner.

4. A photometric instrument comprising a code symbol scanner, a spectrophotometer, means responsive to readings from said scanner and spectrophotometer for providing spectro measurement data, and a housing in which said scanner and spectrophotometer are integrated with each other as a unitary assembly.

5. The instrument according to claim 4 further comprising a mechanism separating said code scanner and said spectrophotometer on opposite sides thereof in said housing, said mechanism having means for insertion and removal of devices having code symbols and photometric material for simultaneous scanning and spectrophotometric reading in said instrument.

6. The instrument according to claim 5 wherein said mechanism comprises a carriage moveable between positions outside and inside of said housing for receiving and carrying said device into reading position.

7. The instrument according to claim 6 wherein said device is a card carrying said body as a patch therein, and a bar code in spaced relationship thereon and means for illuminating said patch and directing light transmitted through said patch to said spectrophotometer.

8. A spectrodensitometer comprising a spectrophotometer and a bar code scanner disposed in assembled relationship as a single instrument for providing integrated spectral readings and identifications thereof a photometric dosimeter card having a patch, the spectral characteristics thereof varying with radiation exposure, and also have a bar code containing calibration data for said patch and identification data respecting said patch, and means in said spectrodensitometer for receiving said card and locating said card for simultaneous reading of said spectral characteristics of said patch and said bar code data.

9. The system according to claim 8 further comprising a housing having compartments separated by a mechanism for locating said card in bar code and spectral reading position therein and said compartments being assembled in integrated relationship with said mechanism and being disposed on opposite sides of said mechanism, said compartments containing said bar code scanner and a spectrophotometer, respectively.

10. The system according to claim 9 further comprising means responsive to the reading of said bar code for initiating and controlling said spectrophotometer to provide said readings.

11. The system according to claim 9 further comprising a host computer having means for translating said bar code into identification number and calibration factor data, and means responsive to said calibration factor data for calculating from said spectrophotometer readings radiation dosage whereby to provide information for display and recording of said dosage.

* * * * *